United States Patent [19]
Loewe

[11] Patent Number: 5,591,281
[45] Date of Patent: Jan. 7, 1997

[54] FLYWHEEL TIRE INFLATION DEVICE

[76] Inventor: Richard T. Loewe, 12882 Olympia Way, Santa Ana, Calif. 92705

[21] Appl. No.: 512,826

[22] Filed: Aug. 9, 1995

[51] Int. Cl.$^6$ .............................. B60C 23/12; F04B 17/06; F04B 19/22
[52] U.S. Cl. ........................ 152/418; 417/233; 417/211
[58] Field of Search ............................. 152/415, 416, 152/417, 418; 417/211, 233, 231

[56] References Cited

U.S. PATENT DOCUMENTS

| | | | |
|---|---|---|---|
| 1,128,455 | 2/1915 | Keith | 152/418 |
| 1,229,039 | 6/1917 | Crane | 152/420 |
| 1,744,405 | 1/1930 | McCord | 152/418 |
| 1,776,933 | 9/1930 | Simmen | 417/211 |
| 2,211,935 | 8/1940 | Parker | 152/418 |
| 2,415,618 | 2/1947 | West | 417/233 X |
| 2,577,458 | 12/1951 | Gaiptman | 152/416 |
| 3,099,309 | 7/1963 | Horta | 152/416 |
| 3,511,294 | 5/1970 | Bepristis | 152/418 |
| 4,154,279 | 5/1979 | Tsuruta | 152/416 |
| 4,313,483 | 2/1982 | Brockmann | 152/416 |
| 4,418,737 | 12/1983 | Goodell et al. | 152/416 |
| 4,582,107 | 4/1986 | Scully | 152/417 |
| 4,583,566 | 4/1986 | Kalavitz | 137/101.19 |
| 4,619,303 | 10/1986 | Bryan et al. | 152/416 |
| 4,685,501 | 8/1987 | Williams | 152/417 |
| 4,744,399 | 5/1988 | Magnuson et al. | 152/417 |
| 4,754,792 | 7/1988 | Braun et al. | 152/417 |
| 4,763,709 | 8/1988 | Scholer | 152/416 |
| 4,875,509 | 10/1989 | Da Silva | 141/38 |
| 4,924,926 | 5/1990 | Schultz et al. | 152/417 |
| 5,325,902 | 7/1994 | Loewe et al. | 152/419 |

FOREIGN PATENT DOCUMENTS 1011756  7/1957  Germany.

Primary Examiner—Michael W. Ball
Assistant Examiner—Francis J. Lorin
Attorney, Agent, or Firm—Stetina Brunda & Buyan

[57] ABSTRACT

A device for automatically maintaining desired air pressure within a vehicle tire utilizes inertial forces from changes in vehicle speed. The device includes a flywheel attached to and concentric with the vehicle wheel but free to rotate relative the wheel, and an air compressor attached to the vehicle wheel and connected to the tire, the compressor piston responsive to rotation of the flywheel with respect to the vehicle wheel to pass air into the tire. Preferably a connecting rod converts the rotation of the flywheel relative the wheel into the reciprocating sliding of a piston to operate the air compressor. Additionally, a centrifugal intake valve is preferably provided that seals off the inlet passageway to the air compressor when the vehicle is stopped or moving slowly to prevent contaminants from entering. Advantageously, the device of the present invention may easily be attached to or removed from the vehicle wheel and is entirely contained on the wheel, without the need for a rotating joint or any physical contact to the vehicle frame or body.

9 Claims, 1 Drawing Sheet

FLYWHEEL TIRE INFLATION DEVICE

FIELD OF THE INVENTION

The present invention relates generally to fluid pressure control apparatus, and more particularly to an automatic tire pressure inflation device which is entirely contained on a vehicle wheel, for maintaining a desired inflation pressure within a tire mounted on said wheel.

BACKGROUND OF THE INVENTION

Maintaining correct inflation pressure in automobile tires is accepted as an effective way to increase fuel economy, decrease tire wear and increase safety. Although proper tire inflation may be maintained by regularly checking tire pressure and adjusting accordingly, such maintenance tends to be largely ignored because of the inconvenience involved. Additionally, tire pressure varies based upon the pressurized air temperature and recent driving conditions sustained by the tire. Varying tire inflation pressure depending upon the road surface offers other benefits such as improved traction, or an increase in tire pressure may be desirable to offset changes in the vehicle payload.

The need for, and interest in, finding a practical means of maintaining proper tire pressure is illustrated by at least 19 patents granted since 1915, at least 13 of which have issued since 1979. Most of the prior art patents involve devices that are not self-contained on a wheel, but rather rely on parts mounted on the vehicle body or frame and additionally require some type of rotating joint, be it mechanical, electrical or pneumatic. Such rotating joints are expensive and impractical in the adverse environment in which vehicle wheels operate, including contaminants such as oil, water, dirt and sand which tend to attack seals necessarily a part of such rotating joints.

For example, U.S. Pat. No. 5,325,902 issued to Loewe et al., and hereby incorporated by reference, describes an automatic tire pressure monitor and inflation system having an electric motor, an air compressor disposed upon the rotating wheel, and an electrical generator. The generator includes coils mounted on the rotating wheel, and a magnet mounted on a non-rotating portion of the vehicle. Thus, this system includes a rotating connection, albeit without physical contact, in which the wheel-mounted components of the generator will interact with the vehicle-mounted components thereof, to induce a voltage for driving the electric motor.

Other contemplated apparatus contained entirely on a rotating vehicle wheel include stored compressed gas or stored energy sources which must be periodically recharged or replaced, offering limited advantages over conventional means of filling tires from stationary compressors. Thus, there remains a need in the art for an apparatus fully contained on a vehicle wheel for maintaining desired inflation pressure within a tire that can be easily attached and detached or permanently mounted on a wheel, without the need for additional components on frame or body portions of the vehicle, and without the need for replenishment of batteries or cartridges.

SUMMARY OF THE INVENTION

The present invention comprises a device and method for maintaining desired inflation pressure within a tire mounted on a rotating vehicle wheel, utilizing inertial forces from changes in the vehicle's speed. The device includes a flywheel rotatably attached to the vehicle wheel, and a small air compressor releasably mounted to the vehicle wheel. A mounting member is preferably employed to attach the components comprising this invention to the vehicle wheel 12, though such components could alternatively be attached directly to the vehicle wheel 12. The compressor is placed in communication with the pressurized tire and is responsive to rotation between the flywheel and wheel, causing compressed air to flow into the tire. Inertia keeps the flywheel rotating at the same speed when the vehicle changes speed, thus producing a relative rotation between the flywheel and the vehicle wheel that drives the compressor. As such, tire inflation is provided by changes in the vehicle's speed, through rotation of the flywheel with respect to the vehicle wheel. Overcoming normal leakage rates from vehicle tires require extremely low flow rates from the compressor, requiring extremely low energy rates to be derived from wheel rotation. This invention is analogous to trickle charging a battery to keep it at full charge.

The preferred embodiment includes a small reciprocating piston type air compressor, having a cylinder adapted to receive a sliding piston responsive to rotation of the flywheel with respect to the wheel. Preferably a connecting rod transfers the movement of the flywheel forcing the piston to reciprocate in and out of the cylinder. The intake stroke of the piston draws outside air into the cylinder, and the compression stroke of the piston forces air into the tire. The compressor of the present invention also preferably includes an inlet passageway configured with a centrifugal valve, such that the inlet passageway is sealed except when the vehicle wheel is rotating at a rate sufficient to keep contaminants from entering the compressor.

The device of the present invention is operable for maintaining desired fluid pressure as follows. Inertial forces associated with changes in the rate of rotation of a vehicle wheel are harnessed by a flywheel rotatably attached to the vehicle wheel, and preferably transferred via a connecting rod to an air compressor, such forces utilized to operate preferably a reciprocating piston type air compressor. A centrifugal valve in the inlet passageway to the compressor is normally closed by spring pressure, and is opened by centrifugal force when the rotational speed of the wheel is great enough so that the centrifugal force on potential liquid or particulate contaminants expel them away from the inlet passageway, preventing their entry into the compressor.

The device and method of the present invention maintain desired inflation pressure within a rotating tire, utilizing only inertia from a flywheel to operate an air compressor. All components of the device may be easily attached to or detached from the vehicle wheel and the need for a rotating joint connecting to parts on the vehicle body or frame is eliminated. The invention does not require a gas cartridge or battery mounted to the vehicle wheel, which would need to be periodically replaced or recharged. Further aspects, objects and advantages will become apparent to those skilled in the art upon reading and understanding of the following detailed description and accompanying drawings.

DETAILED DESCRIPTION OF THE PREFERRED EMBODIMENT

The following detailed description and the accompanying drawings describe and illustrate a presently preferred embodiment of the invention only, and are not intended to limit the scope of the invention in any way.

Figure 1:
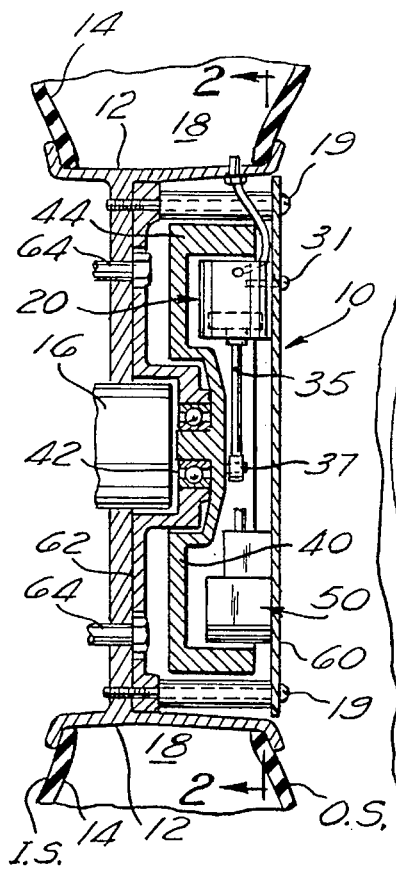
FIG. 1 is a side view of a vehicle wheel and tire, including a partial cross-sectional view of the device of the present invention mounted thereon.
Figure 2:
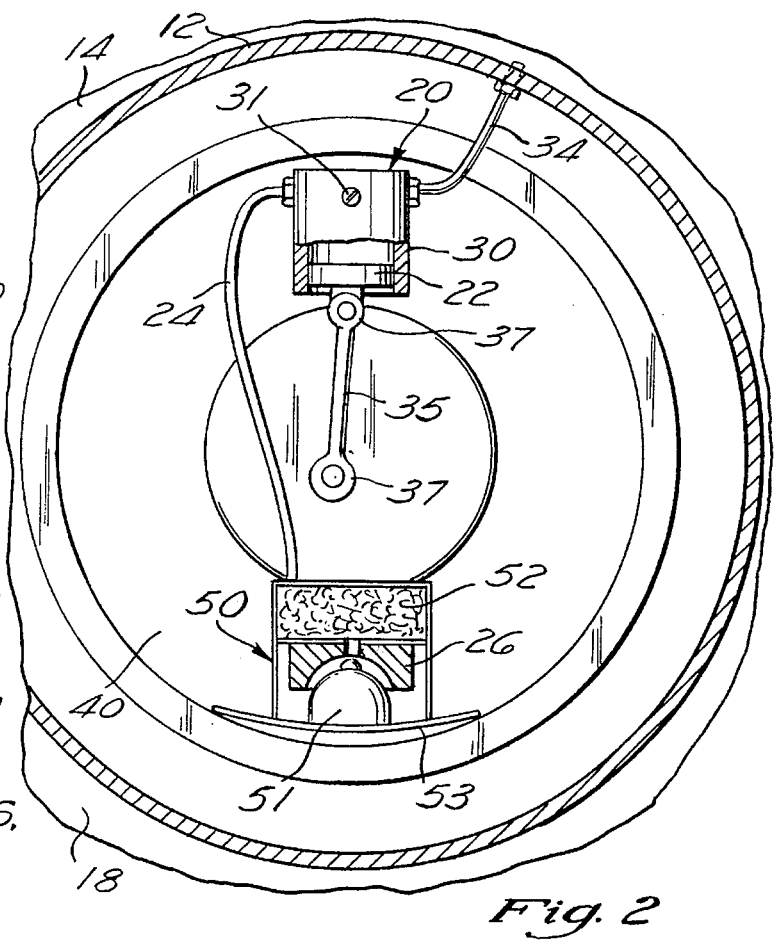
FIG. 2 is a front cross-sectional view of the device of the present invention.
Figure 3:
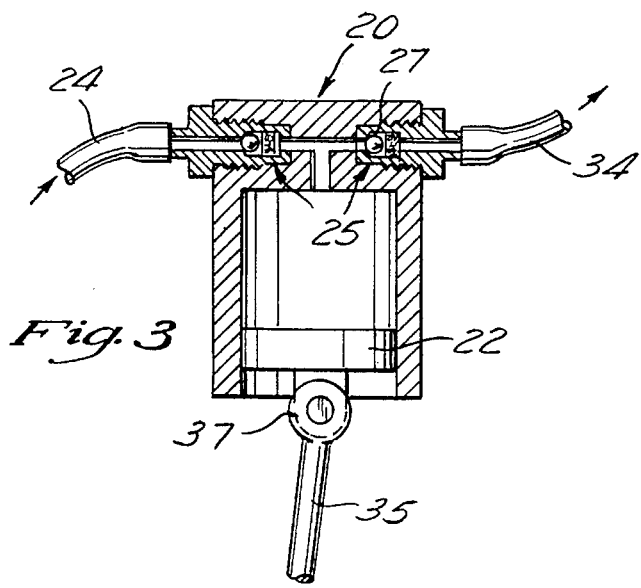
FIG. 3 is an enlarged cross-sectional view of the compressor.

The flywheel tire inflation device 10 of the preferred embodiment of the present invention is illustrated in FIGS. 1–3. Referring first to FIGS. 1 and 2, the environment of the present invention is a vehicle wheel 12 that supports a tire 14. The flywheel tire inflation device 10 of the preferred embodiment includes a flywheel 40, compressor 20, preferably a reciprocating piston type, and centrifugal intake valves 50, all indirectly attached to the vehicle wheel 12 by way of mounting members such as a wheel cover 60, and bracket 62. Alternatively, all components comprising this invention may be attached directly to the vehicle wheel 12. The flywheel 40 is free to rotate, with changes in the vehicle's speed causing rotation of the flywheel 40 relative to the vehicle wheel 12. The rotation of the flywheel 40 is preferably translated into a reciprocating sliding motion of the piston 22 to create the intake and compression strokes of the compressor 20.

The translation of the flywheel 40 rotation relative to the vehicle wheel 12 into the reciprocating piston 22 is preferably accomplished by a connecting rod 35 having pivoting connections 37 on its opposing ends. The lower end of the connecting rod 35 (as shown in FIG. 2) is connected to the flywheel 40 eccentric the flywheel 40, but free to rotate with respect to the flywheel 40. The upper end of the connecting rod 35 (as shown in FIG. 2) is connected to the piston 22 and free to pivot with respect to the piston 22. The flywheel 40 is mounted in bearings 42 concentric with the axle hub 16. The flywheel 40 is configured to closely follow the outside surface (O.S.) of the vehicle wheel 12 while still leaving sufficient clearance to ensure no contact. The flywheel 40 is also preferably configured having its mass concentrated on an outboard rim 44, which increases the flywheel 40 moment of inertia thereby increasing the energy associated with rotation of the flywheel 40. Importantly, all components of the present invention are attached to a mounting member such as a wheel cover 60/mounting bracket 62 assembly (held together by assembly bolts 19), that can be easily attached or removed from the vehicle wheel 12. No alterations to the vehicle wheel 12 are required to accommodate the mounting screws 64, which secure the mounting bracket 62 to the vehicle wheel 12, these being the same screws 64 that secure the vehicle wheel 12 to the axle 16, making the device 10 suitable as an aftermarket add-on.

Now also referring to FIG. 3, the reciprocating piston type compressor 20 of the preferred embodiment of the present invention may be more fully described. The compressor 20 includes an inlet passageway 24 through which air enters the air compressor 20 cylinder 30. The compressor 20 also includes an outlet passageway 34 connected to the pressurized volume 18 of the tire 14. Contained in the inlet passageway 24 and outlet passageway 34 near the cylinder 30 are a pair of check valves 25, which provide one-way air flow from the intake orifice 26 and/or from the cylinder 30 into the pressurized volume 18 of the tire 14. The check valves 25 each contain a solid neoprene ball 27 and a porous disc 29 (that allows air to flow through). The check valves 25 are arranged such that air is permitted to enter the inlet end and allowed to flow through the outlet end, as the disc 29 prevents the ball 27 from seating at the outlet end. The check valves 25 are also arranged such that centrifugal forces associated with rotation of the vehicle wheel 12 do not act upon the balls 27 to bias their movement.

The air compressor 20 further includes an adjustment screw 31, located in the outside surface (O.S.) of the wheel cover 60 for accessibility. The adjustment screw 31 allows the minimum volume of the cylinder 30 of the compressor 20 to be manually varied, effectively changing the compression ratio of the compressor 20, thereby determining the maximum pressure applied to the pressurized volume 18 of the tire 14. Limiting the compression ratio of the compressor 20 limits the pressure generated by the compressor 20, preventing unintentional overinflation of the tire 14 and obviating use of a pressure relief valve. The adjustment screw 31 may be screwdriver operated to permit manual adjustments of the maximum pressure of the compressor 20, such an adjustment being calibrated with respect to air pressure at sea level or some other base altitude. Although the description of the preferred embodiment assumes a compressor 20 comprising a cylinder 30 and a piston rod 22, the possibility of utilizing other types of compressors is contemplated, such as a bellows compressor, a diaphragm compressor, a linear compressor, or a rotary compressor.

The inlet passageway 24 preferably includes a centrifugal intake valve 50 and a filter 52. A centrifugal intake valve 50 is preferably of a spring 53 and plug 51 configuration, the valve 50 being normally closed by the metal strip spring 53 forcing the plug 51 to seal the intake orifice 26 through which air enters the inlet passageway 24. The centrifugal force on the mass of the plug 51 opens the centrifugal intake valve 50 when the vehicle wheel 12 is rotating at a rate sufficient for the centrifugal force on potential liquid and particulate contaminants to expel such contaminants from the intake orifice 26 and surrounding area. The centrifugal intake valve 50 permits immersion of the wheel 12 in water without allowing water into the inlet passageway 24. Because of the especially adverse environment in which vehicle wheels 12 operate, as a further precaution, a conventional air filter 52 is included in the inlet passageway 24 between the centrifugal intake valve 50 and the inlet check valve 25 to reduce the likelihood of contaminants entering the compressor 20.

A possible alternate embodiment of the flywheel tire inflation device 10 of the present invention (not shown) uses a conventional generator to convert the flywheel 40 rotation with respect to the vehicle wheel 12 into electrical energy. The electricity from the generator is used to power a conventional electrically driven air compressor.

Now referring to FIGS. 1–3, an example of the operation and use of the flywheel tire inflation device 10 of the preferred embodiment may be described. Initially the vehicle wheel 12 and the flywheel 40 are both at rest. As the vehicle accelerates, the flywheel 40 tends to remain at rest creating a relative rotation between the vehicle wheel 12 and the flywheel 40. The rotation of the vehicle wheel 12 is gradually transmitted to the flywheel 40 by the energy transfer through the compressor 20. The flywheel 40 will eventually reach the same rotation rate as the vehicle wheel 12. Then when the vehicle wheel 12 slows its rotation about the vehicle axle 16, the flywheel 40 tends to continue rotating at the same rate. Again, the relative motion between the flywheel 40 and the vehicle wheel 12 is transferred through the connecting rod 35 to the reciprocating piston 22 of the compressor 20, until the flywheel 40 rotation rate again equals the vehicle wheel 12 rotation rate. As such, tire inflation is directly provided by tapping into changes in the vehicle's speed through relative rotation of the flywheel 40, and transferring this relative rotation into the compressor 20 intake and compression strokes.

When the outside ambient air pressure exceeds the pressure in the cylinder 30 during the intake stroke of the piston 22, the check valve 25 in the inlet passageway 24 opens, drawing air into the intake orifice 26 through the centrifugal intake valve 50, and through the filter 52 and into the compressor 20 cylinder 30. Thereafter, during the piston 22 compression stroke, the pressure in the cylinder 30 exceeds the ambient pressure and the check valve 25 in the inlet passageway 24 closes. As the compression stroke continues, the pressure in the cylinder 30 may exceed the pressure in the tire 14. When it does, the check valve 25 in the outlet passageway 34 opens and the air contained within the cylinder 30 is expelled into the pressurized volume 18 of the tire 14.

It is understood that the flywheel tire inflation device 10 described herein and shown in the drawings represents only a presently preferred embodiment of the invention. Indeed, various modifications and additions including but not limited to those discussed above may be made to the preferred embodiment without departing from the spirit and scope of the invention. By way of example only, other means of applying the inertial forces inherent in the changes in rotation rate of the wheel to actuate the compressor may be suitable, such as a mass and coiled spring may be used wherein a change in the rate of rotation of the wheel winds the spring and the spring drives the compressor as it unwinds when the rotation rate is not changing. These and other modifications may be obvious to those skilled in the art and may be implemented to adapt the present invention for use in a variety of different applications.

What is claimed is:

1. A device for maintaining desired inflation pressure within a tire mounted on a rotating vehicle wheel, said device utilizing inertial forces from changes in vehicle speed, the device comprising:

a flywheel rotatably attached to said vehicle wheel such that said flywheel is disposed concentrically with respect to said wheel; and a fluid compressor attached to the vehicle wheel in fluid communication with said tire, said compressor of the reciprocating piston type having a cylinder adapted to receive a sliding piston responsive to rotation of said flywheel relative the vehicle wheel, causing air to pass into the tire.

2. The device of claim 1, further comprising:

a connecting rod having one end rotatably attached to said flywheel eccentric the flywheel and having an opposing end rotatably attached to said piston, to transfer the rotation of the flywheel relative the vehicle wheel into reciprocating movement of the piston.

3. The device of claim 1, wherein:

the compressor has an adjustment means to vary the maximum pressure applied in passing fluid to the tire, to control the inflation pressure.

4. The device of claim 2, wherein:

the compressor has adjusting means to vary the volume of the cylinder, thereby altering the compression ratio.

5. The device of claim 1, wherein:

the compressor has an inlet passageway through which air is drawn into the compressor; and said inlet passageway further comprising a centrifugal closure apparatus, operative to close off the inlet passageway when the vehicle wheel is not rotating at a rate sufficient to preclude entry of foreign matter, but operative to open the inlet passageway when the vehicle wheel is rotating at a rate sufficient to expel foreign matter by centrifugal force.

6. The device of claim 5, wherein:

said centrifugal closure apparatus comprises a spring member having a plug attached thereto, said plug being positioned relative to the inlet passageway, such that when the vehicle wheel is rotating at said sufficient rate, the force of said spring member will be overcome by the centrifugal force on said plug to move the plug away from the inlet passageway, and such that when the vehicle wheel is rotating at less than said sufficient rate, the spring member will force the plug against the inlet passageway, thereby blocking the inlet passageway.

7. The device of claim 5, wherein:

the inlet passageway further comprises a filter, to preclude contaminants from entering the compressor.

8. A device for maintaining desired inflation pressure within a tire mounted on a rotating vehicle wheel, said device utilizing inertial forces from changes in vehicle speed, the device comprising:

a mounting member releasably attached to said vehicle wheel;

a flywheel rotatably attached to said mounting member such that said flywheel is disposed concentrically with respect to said wheel; and a fluid compressor attached to the mounting member in fluid communication with said tire, said compressor responsive to rotation of said flywheel relative the vehicle wheel, causing air to pass into the tire;

whereby the device is attachable to the vehicle wheel without alteration to the vehicle wheel.

9. The device of claim 8, wherein:

the mounting member incorporates a locking means to prevent theft of the device.

* * * * *